United States Patent
He et al.

(10) Patent No.: US 8,582,043 B2
(45) Date of Patent: Nov. 12, 2013

(54) 2D/3D SWITCHABLE LC LENS UNIT FOR USE IN A DISPLAY DEVICE

(75) Inventors: Chengming He, Guangdong (CN);
Chihtsung Kang, Guangdong (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 284 days.

(21) Appl. No.: 12/996,998

(22) PCT Filed: Nov. 15, 2010

(86) PCT No.: PCT/CN2010/078755
§ 371 (c)(1),
(2), (4) Date: Dec. 9, 2010

(87) PCT Pub. No.: WO2012/048485
PCT Pub. Date: Apr. 19, 2012

(65) Prior Publication Data
US 2012/0092586 A1    Apr. 19, 2012

(30) Foreign Application Priority Data

Oct. 13, 2010   (CN) .......................... 2010 1 0512421

(51) Int. Cl.
*G02F 1/1335*    (2006.01)
(52) U.S. Cl.
USPC .......................................... 349/15; 349/200
(58) Field of Classification Search
None
See application file for complete search history.

(56) References Cited

U.S. PATENT DOCUMENTS

| | | | | |
|---|---|---|---|---|
| 7,532,272 | B2 * | 5/2009 | Woodgate et al. | 349/95 |
| 2009/0033812 | A1 * | 2/2009 | Ijzerman et al. | 349/15 |

FOREIGN PATENT DOCUMENTS

| | | |
|---|---|---|
| CN | 1797044 A | 7/2006 |
| CN | 101126840 A | 2/2008 |
| CN | 101246262 A | 8/2008 |
| CN | 201229434 Y | 4/2009 |
| JP | 2007025263 A | 2/2007 |
| KR | 20070082606 A | 8/2007 |

* cited by examiner

*Primary Examiner* — Richard Kim
(74) *Attorney, Agent, or Firm* — Mark M. Friedman

(57) ABSTRACT

The present invention discloses an auto-stereoscopic display and a liquid crystal lens (LC lens) unit. The LC lens unit orderly consists of a concave lens, a birefringence LC convex lens, and a conductive layer from an emitting surface to an incident surface. The birefringence LC convex lens, embedded in the concave lens, has both a ordinary refractive index and a extraordinary refractive index. The conductive layer has a plurality of control electrodes which generate an electric field to adjust an alignment of LC molecules of the birefringence LC convex lens for adjusting the equivalent refractive index of the birefringence LC convex lens to make the equivalent refractive index between the refractive index of the concave lens and the extraordinary refractive index of the birefringence LC convex lens. The aim is to compensate a viewer for a refraction angle of light that the human eye requires when the viewer observes an auto-stereoscopic display with different distances. In addition, the extraordinary refractive index is far larger than ordinary refractive index. Once the LC molecules rotate by a slight angle, the incident polarized light obtains larger refractive index. Thus, a 3D/2D switch is achieved. In other words, a smaller electric field can achieve the target of a 3D/2D switch, which reduces power consumption.

11 Claims, 5 Drawing Sheets

2D/3D SWITCHABLE LC LENS UNIT FOR USE IN A DISPLAY DEVICE

BACKGROUND OF THE INVENTION

1. Field of the Invention

The present invention relates to a display device, and more particularly, to a 2D/3D switchable liquid crystal lens (LC lens) unit for use in a display device.

2. Description of Prior Art

Real-world images are perceived by the human eye, and further, so-called three-dimensional (3D) images are perceived by the human brain depending on an apparent displacement of an object viewed along two different lines of sight. Such a displacement or a spatial difference is called parallax. A so-called 3D display device, simulating human vision to form different viewing angles, is capable of conveying 3D images to the viewer. The 3D display device produces two different 2D images with parallax, one for the viewer's right eye and the other for the left eye. Afterwards, the viewer's brain perceives these two different 2D images as a 3D image.

Nowadays, there are two types of 3D display devices in general, auto-stereoscopic displays and stereoscopic displays. A user of an auto-stereoscopic display can see three-dimensional images without wearing special type glasses. As for a user of a stereoscopic display, he/she has to wear special type glasses to see three-dimensional images. A commonly seen auto-stereoscopic display is divided into two types: slit grating auto-stereoscopic displays and microlens array auto-stereoscopic displays. The theorem of slit grating auto-stereoscopic displays lies on that a user sees parallax images through both eyes based on an opaque parallax barrier, and the parallax images is perceived as stereoscopic view in the brain. As for microlens array auto-stereoscopic displays, an LC lens unit acts as a lenticular lens and is attached onto an LC panel. The LC lens unit is fitly made of a single refractive index microlens array and a birefringence index microlens array fitly. The birefringence index microlens array is made of liquid crystals. The variations of the electric field applied on the birefringence index microlens make LC molecules adjust the alignment and the refractive index. The horizontal direction of LC molecules becomes the vertical one, and the ordinary refractive index $n_o$ becomes the extraordinary refractive index $n_e$. In this way, the light emitted to the lens unit has various emitting directions owing to variations of the refractive index of the birefringence index microlens. According to this theorem, the user can see light with two different types of refractive angles, which makes it possible to switch between 2D/3D images. However, a traditional lens unit structure is that two-layer control electrodes are individually disposed on the upper and lower sides of the birefringence index microlens. The two-layer control electrodes have a driving voltage difference which generates an electric field. The electric field adjusts the horizontal direction of the LC molecules into the vertical direction. Generally speaking, the driving voltage difference goes up to 5 volts or more. So, to produce a lens unit with low driving voltage for switching between 2D/3D images will meet ecological demands greatly.

SUMMARY OF THE INVENTION

Therefore, an object of the present invention is to provide a 2D/3D switchable LC lens unit and a display device. The LC lens unit adjusts the refractive index of a birefringence convex lens by utilizing an electric field produced by control electrodes on a conductive layer to solve the problem occurring in the prior art.

According to the present invention, a 2D/3D switchable display device comprises a backlight module for generating light, a liquid crystal display panel for showing an image based on the light from the backlight module, and a liquid crystal (LC) lens unit. The light emitting from the liquid crystal display panel is polarized light. The LC lens unit from an emitting surface to an incident surface orderly comprises a plurality of bar-shaped concave lens, and a plurality of bar-shaped LC convex lens. Each LC convex lens corresponds to one of the bar-shaped concave lens. The plurality of LC convex lens comprises a transparent substrate, a conductive layer on the transparent substrate, and a first LC layer sandwiched between the concave lens and the transparent substrate. The conductive layer comprises a plurality of control electrodes for controlling an alignment of LC molecules inside the LC convex lens to adjust an equivalent refractive index of the LC convex lens larger or equaling to a first refractive index of the concave lens.

According to the present invention, a LC lens unit from an emitting surface to an incident surface orderly comprises a plurality of bar-shaped concave lens, and a plurality of bar-shaped LC convex lens. Each LC convex lens corresponds to one of the bar-shaped concave lens. The plurality of LC convex lens comprises a transparent substrate, a conductive layer on the transparent substrate, and a first LC layer sandwiched between the concave lens and the transparent substrate. The conductive layer comprises a plurality of control electrodes for controlling an alignment of LC molecules inside the LC convex lens to adjust an equivalent refractive index of the LC convex lens larger or equaling to a first refractive index of the concave lens.

In one aspect of the present invention, the refractive index of the concave lens equals to an extraordinary refractive index of LC molecules of the first LC layer.

In another aspect of the present invention, the control electrodes are shaped as bars, which extends along a direction parallel to an extending direction of the bar-shaped LC convex lens. The LC lens unit cooperates with linear polarized light and the bar-shaped LC convex lens extend along a first direction and arrange in a second direction perpendicular to the first direction, the polarized direction is perpendicular to the first direction. The LC convex lens further comprises an alignment film disposed between the first LC layer and the transparent substrate, and the alignment is used for aligning the optical axis of the liquid crystal molecules inside the first LC layer with first direction before an electric field is applied on the liquid crystal molecules inside the first LC layer. The LC molecules inside the first LC layer are positive liquid crystal molecules whose optical axes are parallel to a direction of the electric field, and each optical axis is slanted away from the first direction by a certain angle.

In still another aspect of the present invention, an extraordinary refractive index of the liquid crystal molecules inside the first layer is 1.2 times larger than an ordinary refractive index of the liquid crystal molecules.

In still another aspect of the present invention, the concave lens is a birefringence concave lens comprising a second LC layer composed of a plurality of liquid crystal molecules of which an alignment is perpendicular to the transparent substrate.

In still another aspect of the present invention, the concave lens is a birefringence concave lens comprising a second LC layer composed of a plurality of liquid crystal molecules of which an alignment is parallel to the transparent substrate.

Compared with the prior art, the display device of the present invention can adjust driving voltage to control rotation angles of LC molecules of an LC convex lens. The equivalent refractive index of the LC convex lens can be accordingly varied to dynamically adjust the refractive index difference between the equivalent refractive index and the refractive index of a concave lens. The aim is to compensate for the refraction angle of light that the human eye requires when the human eye observes different distances of a display device. In addition, the refractive index of an extraordinary light of the LC convex lens is far larger than that of an ordinary light of the LC convex lens. When the LC molecules rotate by a slight angle, the incident polarized light can obtain a more apparent variation of refractive index to achieve the target of a 3D/2D switch. This also means that a smaller electric field can achieve the target a 3D/2D switch, which reduces power consumption indirectly.

These and other objectives of the present invention will no doubt become obvious to those of ordinary skill in the art after reading the following detailed description of the preferred embodiment, which is illustrated in the various figures and drawings.

DETAILED DESCRIPTION OF THE PREFERRED EMBODIMENTS

Figure 1:
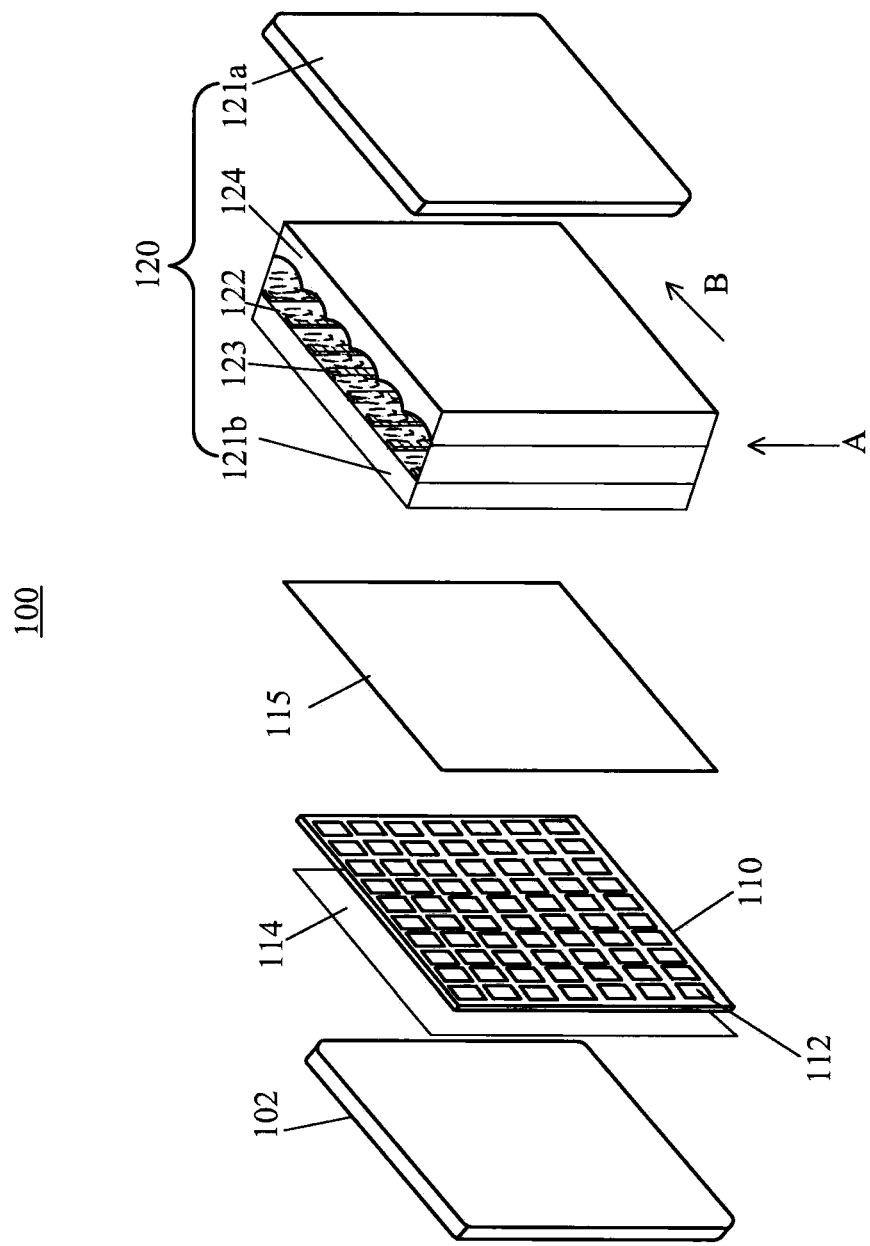
FIG. 1 is a schematic diagram of a display device displaying 3D images according to a preferred embodiment of the present invention.

The invention is described below in detail with reference to the accompanying drawings, wherein like reference numerals are used to identify like elements illustrated in one or more of the figures thereof, and in which exemplary embodiments of the invention are shown. Spatially relative terms, such as "beneath", "below", "lower", "above", "upper", "left", "right", "top", "bottom", "horizontal", "perpendicular", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Please refer to FIG. 1, which is a schematic diagram of a display device 100 displaying 3D images according to a preferred embodiment of the present invention. The viewer can convert 2D images into 3D images and 3D images into 2D images when using the display device 100. The display device 100 comprises a backlight module 102, an LC panel 110, polarizer films 114 and 115 at both sides of the liquid crystal display (LCD) panel 110, and a liquid crystal (LC) lens unit 120. The backlight module 102 provides a uniform planar light source for the LC panel 110. The LC panel 110 provides LC materials between a pair of transparent glass substrates on which indium tin oxide (ITO) as a conducting electrode is disposed. The LC panel 110 comprises a pixel array made of a plurality of pixels 112. When the backlight generated by the backlight module 102 radiates onto the LC panel 110, alignment of the LC molecules corresponding to each pixel 112 is changed by driving each pixel 112 to adjust strength of emission of the backlight to show different gray levels. The LC panel 110 is situated between the polarizer films 114 and 115. The orientation of the polarization axis of the polarizer film 114 has a 90° shift with that of the polarizer film 115. Only components of the transmitted light complies with the polarization axes of the polarizer film 114 and of the polarizer film 115 pass. The present invention is elaborated upon but is not restricted to based on a direction parallel to Direction B, i.e. a polarized direction of the light emitted from the polarizer film 115.

Figure 2:
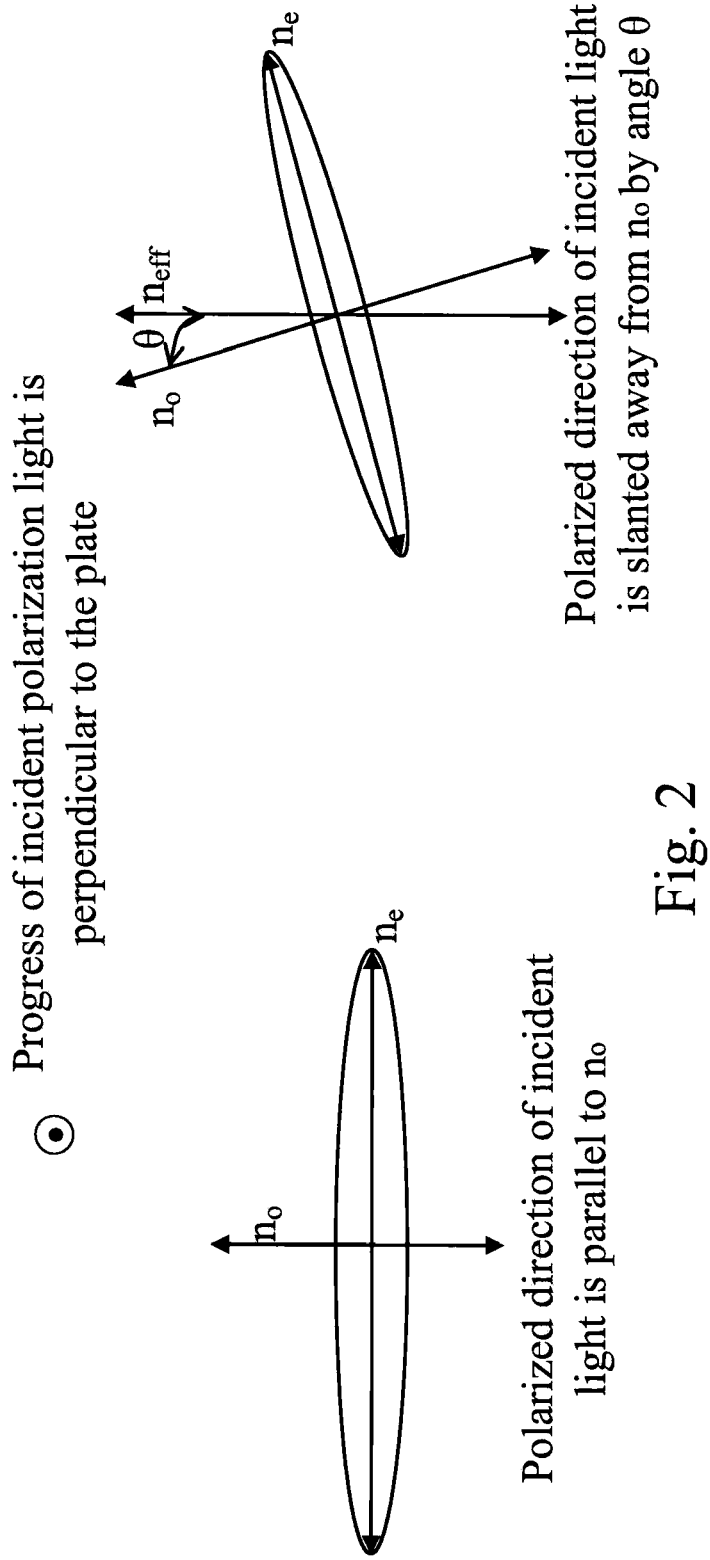
FIG. 2 is a schematic diagram of an alignment of the LC molecules and a polarized direction of the incident polarized light.
Figure 3:
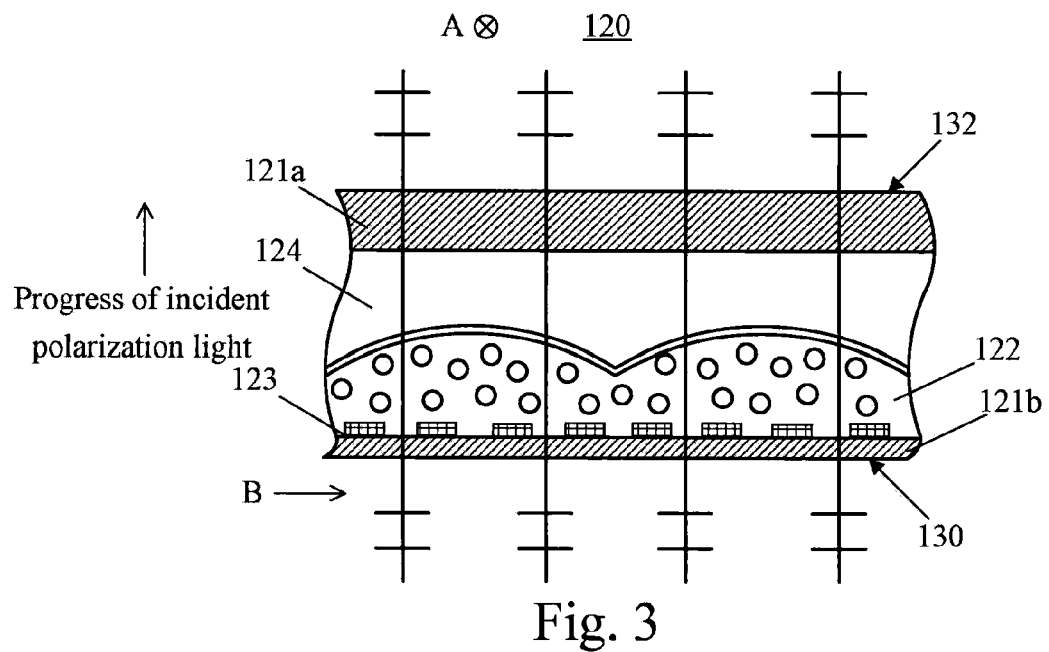
FIG. 3 is a schematic diagram illustrating a cross section of the LC lens unit of FIG. 1 in sight of a direction of Arrow A and an optical path of the incident polarized light before the LC molecules inside an LC convex lens change their alignment according to first embodiment of the present invention.

Please refer to FIGS. 1, 2, and 3. FIG. 2 is a schematic diagram of an alignment of the LC molecules and a polarized direction of the incident polarized light. FIG. 3 is a schematic diagram illustrating a cross section of the LC lens unit 120 of FIG. 1 in sight of a direction of Arrow A and an optical path of the incident polarized light before the LC molecules inside an LC convex lens 122 change their alignment according to first embodiment of the present invention. From an emitting surface 132 to an incident surface 130, the LC lens unit 120 orderly comprises a transparent glass substrate 121a, a plurality of bar-shaped concave lenses 124 each of which is extended along the first direction A and is parallel to one another, a plurality of bar-shaped LC convex lens 122 of which is also extended along the first direction A, and parallel to one another, and is correspondingly embedded to one of concave lenses 122. The LC convex lens 122 comprises a transparent glass substrate 121b, a conductive layer 123 on the transparent glass substrate 121b, and a first LC layer sandwiched between the concave lenses 124 and the transparent glass substrate 121b. Each bar-shaped concave lens 124 and each bar-shaped LC convex lens 122 are arranged in a direction of arrow B which is perpendicular to the direction of arrow A. In another embodiment, there is no need to use a transparent glass substrate 121a for the LC lens unit 120. What is needed, instead, is to apply a protective film made of cloth to an emitting surface of the concave lenses 124.

The conductive layer 123 comprises a plurality of parallel and slender control electrodes. A gap is reserved between each pair of adjacent slender control electrodes. An alignment film is disposed on the top of the conductive layer 123 (not shown in the figures). The alignment film has a function of regulating alignment of the LC molecules in a certain direction before an electric field is applied on the LC molecules. The LC convex lens 122 is a birefringence convex lens. The liquid crystals inside the LC convex lens 122 have both a first ordinary refractive index $n_o$ and a first extraordinary refractive index $n_e$. When the polarized direction of the incident polarized light of the LC convex lens 122 is perpendicular to the direction of the optical axis of the LC molecules, the LC convex lens 122 has the first ordinary refractive index $n_o$ for the incident polarized light at this time. When the polarized direction of the incident polarized light of the LC convex lens 122 is in parallel to the direction of the optical axis of the LC molecules, the LC convex lens 122 has the first extraordinary refractive index $n_e$ for the incident polarized light at this time. In the present embodiment, the refractive index n of the concave lens 124 is equal to the first ordinary refractive index $n_o$. As shown in FIG. 3, owing to the alignment film, the alignment of the LC molecules between the two slender control electrodes is perpendicular to the paper surface before driving voltage is applied on the two slender control electrodes of the conductive layer 123. The polarized direction of the incident polarized light emitted to the LC convex lens 122 from the polarizer film 115 through the incident surface 130 is perpendicular to the optical axis of the LC molecules.

For the incident polarized light of the LC convex lens 122, the refractive index n of the concave lens 124 is equal to the first ordinary refractive index $n_o$ of the LC convex lens 122, so there is no refractive index difference between the LC convex lens 122 and the concave lens 124. The light can progress in straight lines, which allows the viewer to see 2D images at the emitting surface 132.

Figure 4:
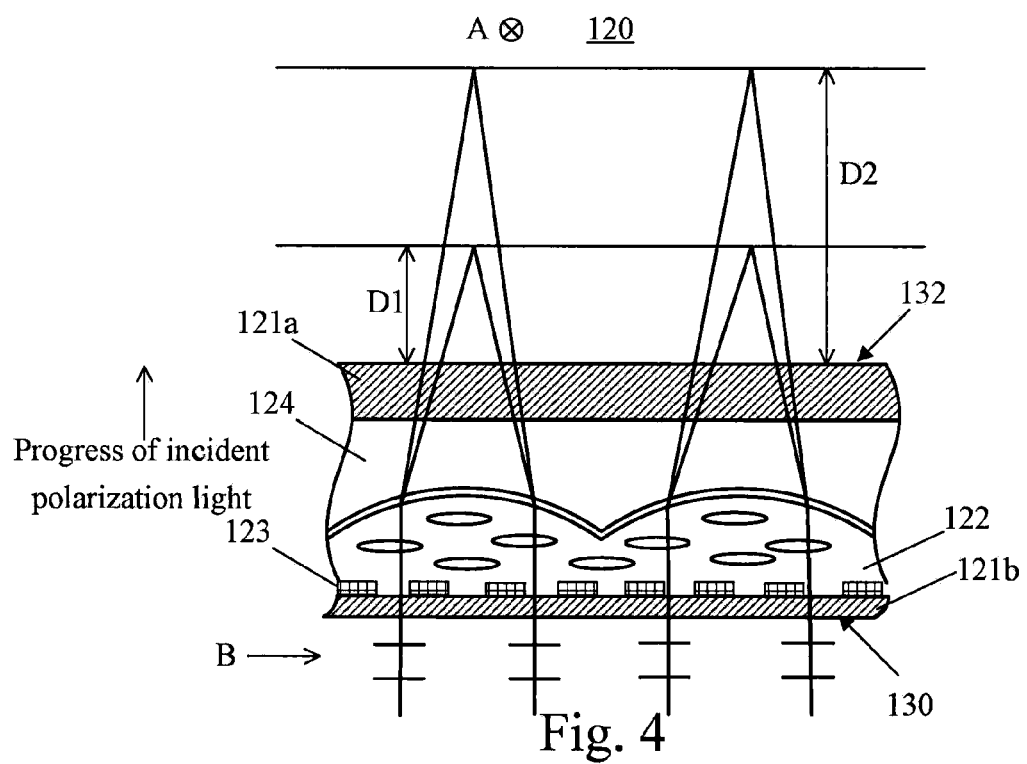
FIG. 4 is a schematic diagram illustrating a cross section of the LC lens unit and an optical path of the incident polarized light after the LC molecules inside the LC convex lens change their alignment according to a first embodiment of the present invention.

Please refer to FIG. 4, which is a schematic diagram illustrating a cross section of the LC lens unit 120 and an optical path of the incident polarized light after the LC molecules inside the LC convex lens 122 change their alignment according to a first embodiment of the present invention. After driving voltage is applied on the two slender control electrodes of the conductive layer 123, the LC molecules between the two slender control electrodes start to rotate. The polarized direction of the incident polarized light emitted from the polarizer film 115 is slanted away from the fast axis (i.e., perpendicular to the optical axis) of the LC molecules by an angle θ. Meanwhile, the LC convex lens 122 has an equivalent refractive index $n_{eff}$. Once the driving voltage increases, the angle θ increases as well. For the incident polarized light, the equivalent refractive index $n_{eff}$ of the LC convex lens 122 is equal to the refractive index $n_e$ of the first extraordinary light when the angle θ is 90 degrees. Practically, the equivalent refractive index $n_{eff}$ at the angle θ measuring between 0 and 90 degrees corresponds to the equivalent refractive index $n_{eff}$ at the angle θ measuring between 90 and 180 degrees. For instance, the equivalent refractive index $n_{eff}$ at the angle θ measuring 45 degrees is the same as that at the angle θ measuring 135 degrees. That is, the refractive index difference is largest between the first ordinary refractive index $n_o$ (the angle θ=0°) and the first extraordinary refractive index ne (the angle θ=90°). So the equivalent refractive index $n_{eff}$ of the LC convex lens 122 is between the first ordinary refractive index $n_o$ and the first extraordinary refractive index $n_e$. The equivalent refractive index $n_{eff}$ of the LC convex lens 122 is larger than the refractive index n ($n=n_o$) of the concave lens 124, which means that the incident polarized light enters an optically thinner medium from an optically denser medium. In this way, the incident polarized light refracts at the junction of the LC convex lens 122 and the concave lens 124 and focuses on the human eye. That's why the user can see 3D images from the emitting surface 132.

In addition, the present embodiment can adjust driving voltage applied on the two slender control electrodes of the conductive layer 123, so that not only the angle θ between the polarized direction of the incident polarized light and the fast axis of the LC molecules, but also the equivalent refractive index $n_{eff}$ of the LC convex lens 122 can make adjustments accordingly. In this way, the refractive index difference between the equivalent refractive index $n_{eff}$ of the LC convex lens 122 and the refractive index n of the concave lens 124 changes as well, which causes that refractive directions of the incident polarized light passing through the LC convex lens 122 and the concave lens 124 are slightly different. In other words, the viewer can see clear and vivid 3D images by simply adjusting the driving voltage to change the equivalent refractive index $n_{eff}$ of the LC convex lens 122 when the distances between the viewer and the emitting surface 132 are D1 and D2, respectively. As for LC materials of the LC convex lens 122, it is preferred to use materials with a first extraordinary refractive index $n_o$ far larger than a first ordinary refractive index $n_o$, such as $n_o \geq 1.2 \times n_o$. At this time, little driving voltage is enough to generate a certain electric field which makes the LC molecules rotate by a certain angle. So the incident polarized light can pass through the two-layer lenses, which have larger refractive index variations, to make the display device 100 convert 2D images into 3D images or 3D images into 2D images. This can reduce power consumption.

In FIG. 3 and FIG. 4, the LC convex lens 122 adopts positive liquid crystal molecules. This means that the alignment of the LC molecules of the LC convex lens 122 is parallel to the direction of the electric field generated by the two slender control electrodes of the conductive layer 123, which is the same as that of Arrow B in FIG. 3 (i.e., Arrow B in FIG. 1). In another embodiment, the LC convex lens 122 adopts negative liquid crystal molecules. The two slender control electrodes align in the direction of Arrow A and extend along the direction of Arrow B.

Figure 5:
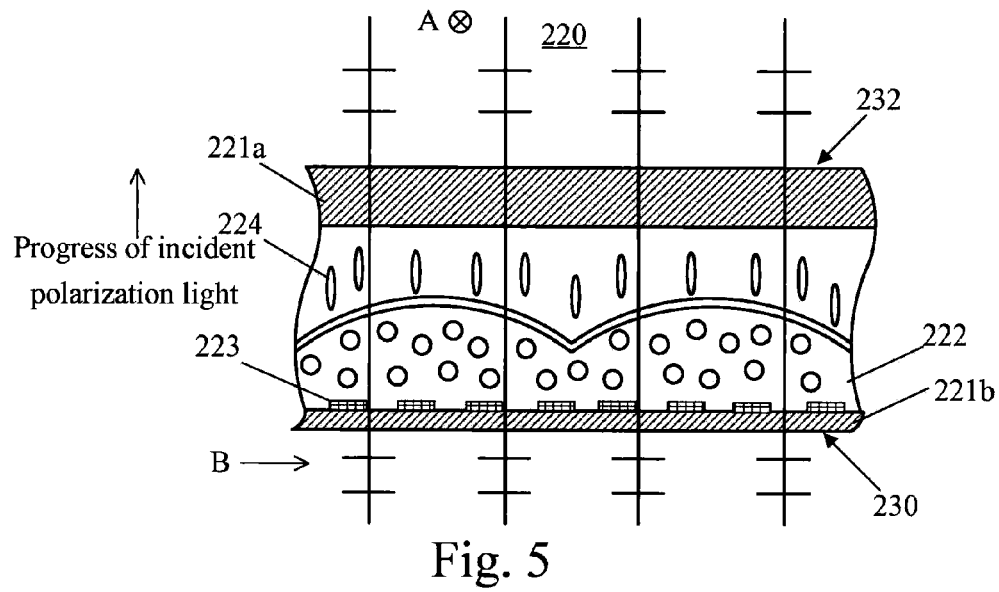
FIG. 5 is a schematic diagram illustrating a cross section of the LC lens unit and an optical path of the incident polarized light before the LC molecules inside an LC convex lens change their alignment in the second embodiment of the present invention.

Please refer to FIG. 5, which is a schematic diagram illustrating a cross section of the LC lens unit 220 and an optical path of the incident polarized light before the LC molecules inside an LC convex lens 222 change their alignment in the second embodiment of the present invention. From an emitting surface 230 to an incident surface 232, the LC lens unit 220 orderly comprises a transparent glass substrate 221a, a plurality of birefringence concave lenses 224 extending parallel to one another, a plurality of semi-cylindrical LC convex lens 122 extending parallel to one another and corresponding to the embedded birefringence concave lenses 222, a conductive layer 223, and a transparent glass substrate 221b. Practically, the LC lens unit 220 is not required to comprise a transparent glass substrate 221a. The difference between the LC lens unit 220 in the second embodiment and the LC lens unit 120 in the first embodiment is that, the optical axis of the LC molecules of the birefringence concave lenses 224 is parallel to the propagation direction of the incident light. The birefringence concave lenses 224 have a second ordinary refractive index $n_{o2}$. The LC convex lens 222, being a birefringence convex lens, has both a first ordinary refractive index $n_{o1}$ and a first extraordinary refractive index $n_{e1}$. The second ordinary refractive index $n_{o1}$ of the birefringence concave lenses 224 is equal to the first ordinary refractive index $n_{o1}$ of the LC convex lens 222. As shown in FIG. 5, an alignment of the LC molecules between the two slender control electrodes is perpendicular to the paper surface before driving voltage is applied on the space between the two slender control electrodes of the conductive layer 223. At this time, the polarized direction of the incident polarized light emitted from the polarizer film 115 through the incident surface 230 is perpendicular to the optical axis of the LC molecules. For the incident polarized light of the LC convex lens 222, the first ordinary refractive index $n_{o1}$ of the LC convex lens 222 is equal to the second ordinary refractive index $n_{o2}$ of the birefringence concave lenses 224, so there is no refractive index difference between the LC convex lens 222 and the birefringence concave lenses 224. The light can progress in straight lines, which allows the viewer to see 2D images from the emitting surface 232.

Figure 6:
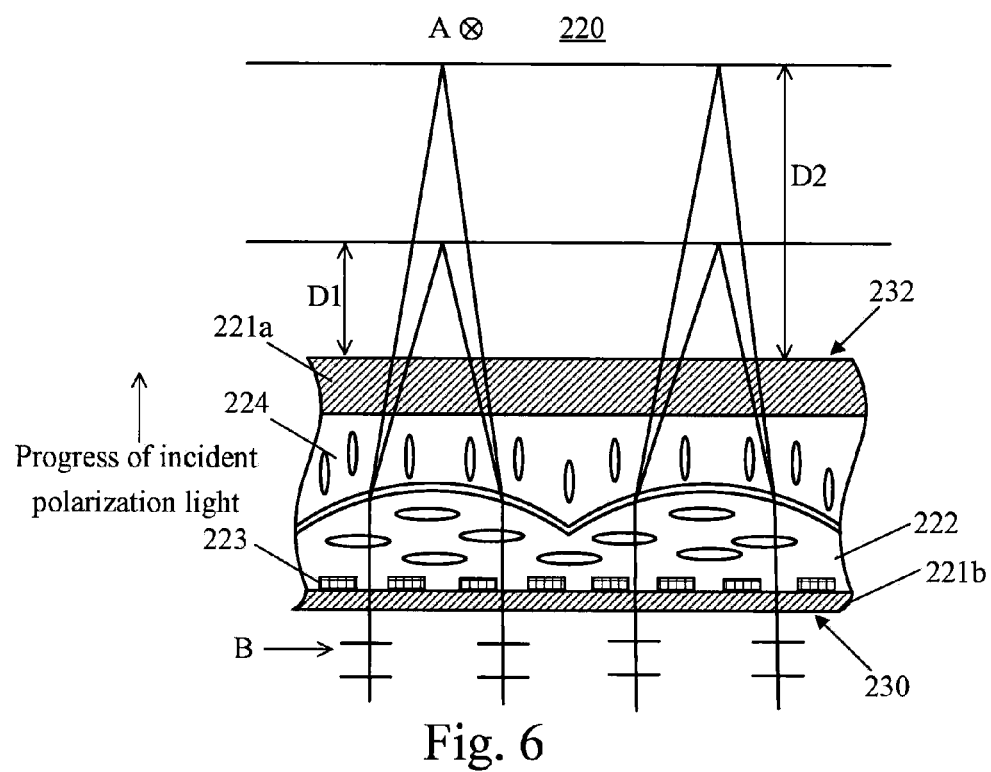
FIG. 6 is a schematic diagram illustrating a cross section of the LC lens unit and an optical path of the incident polarized light after the LC molecules inside the LC convex lens change their alignment in the second embodiment of the present invention.

Please refer to FIG. 6, which is a schematic diagram illustrating a cross section of the LC lens unit 220 and an optical path of the incident polarized light after the LC molecules inside the LC convex lens 222 change their alignment in the second embodiment of the present invention. After driving voltage is applied on the two slender control electrodes of the conductive layer 223, the LC molecules existing between the two slender control electrodes start to rotate. The polarized direction of the incident polarized light emitted from the polarizer film 115 is slanted away from the fast axis of the LC molecules by an angle θ, and meanwhile the LC convex lens 222 has an equivalent refractive index $n_{eff}$. Once the driving voltage increases, the angle θ increases as well. For the incident polarized light, the equivalent refractive index $n_{eff}$ of the LC convex lens 222 is equal to the first extraordinary refractive index $n_{e1}$ when the angle θ is 90 degrees. So the equivalent refractive index $n_{eff}$ of the LC convex lens 222 is in a range between the first ordinary refractive index $n_{o1}$ and the first extraordinary refractive index $n_{e1}$. The equivalent refractive index $n_{eff}$ of the LC convex lens 122 is larger than the second ordinary refractive index $n_{o2}$ ($n_{o2}=n_{o1}$) of the birefringence concave lenses 224, which means that the incident polarized light enters an optically thinner medium from an optically denser medium. In this way, the incident polarized light refracts at the junction of the LC convex lens 222 and the birefringence concave lenses 224 and focuses on the human eye. That's why a user can see 3D images from the emitting surface 232.

In addition, the present embodiment can adjust driving voltage applied on the two slender control electrodes of the conductive layer 223. The angle θ between the polarized direction of the incident polarized light and the fast axis the LC molecules and the equivalent refractive index $n_{eff}$ of the LC convex lens 222 can make adjustments accordingly. In this way, the refractive index difference between the equivalent refractive index $n_{eff}$ of the LC convex lens 222 and the second ordinary refractive index $n_{o2}$ of the birefringence concave lenses 224 changes as well, which causes that refractive directions of the incident polarized light passing through the LC convex lens 222 and the birefringence concave lenses 224 are slightly different. In other words, the viewer can see clear and vivid 3D images by simply adjusting the driving voltage to change the equivalent refractive index $n_{eff}$ of the LC convex lens 122 when the distances between the viewer and the emitting surface 232 are D1 and D2, respectively. As for LC materials of the LC convex lens 222, it is preferred to use materials with a first extraordinary refractive index $n_{e1}$ far larger than a first ordinary refractive index $n_{o1}$, such as $n_{e1} \geq 1.2 \times n_{o1}$. At this time, little driving voltage is enough to generate a certain electric field which makes the LC molecules rotate by a certain angle. So the incident polarized light can pass through the two-layer lenses, which have larger refractive index variations, to make the display device 100 convert 2D images into 3D images and 3D images into 2D images. This can reduce power consumption.

In FIG. 5 and FIG. 6, the LC convex lens 222 adopts positive liquid crystal molecules. This means that the alignment of the LC molecules of the LC convex lens 222 is parallel to the direction of the electric field generated by the two slender control electrodes of the conductive layer 223, which is the same as that of Arrow B in FIG. 5 (i.e., Arrow B in FIG. 1). In another embodiment, the LC convex lens 222 adopts negative liquid crystal molecules. The two slender control electrodes align in the direction of Arrow A and extend along the direction of Arrow B.

Figure 7:
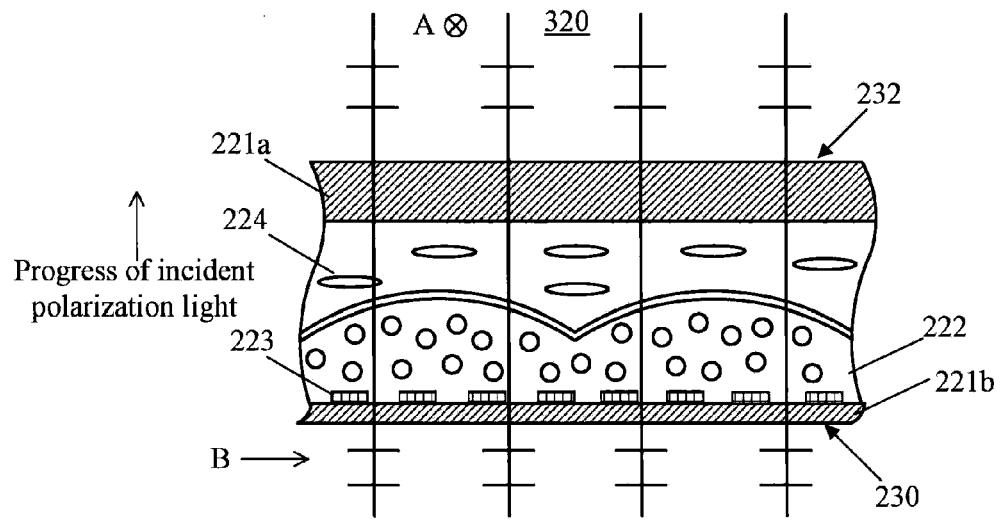
FIG. 7 is a schematic diagram illustrating a cross section of the LC lens unit and an optical path of the incident polarized light before the LC molecules inside an LC convex lens change their alignment in the third embodiment of the present invention.
Figure 8:
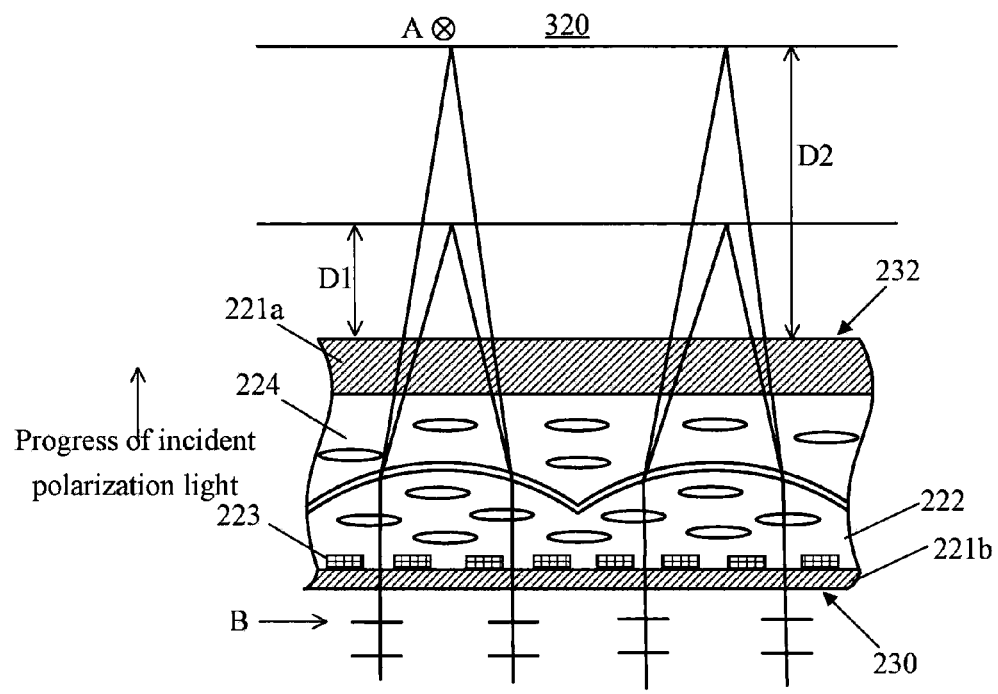
FIG. 8 is a schematic diagram illustrating a cross section of the LC lens unit and an optical path of the incident polarized light after the LC molecules inside the LC convex lens change their alignment in the third embodiment of the present invention.

Please refer to FIG. 7 and FIG. 8. FIG. 7 is a schematic diagram illustrating a cross section of the LC lens unit 320 and an optical path of the incident polarized light before the LC molecules inside an LC convex lens 322 change their alignment in the third embodiment of the present invention. FIG. 8, which is a schematic diagram illustrating a cross section of the LC lens unit 320 and an optical path of the incident polarized light after the LC molecules inside the LC convex lens 322 change their alignment in the third embodiment of the present invention. It is noted that, for simplicity, elements in FIGS. 7 and 8 that have the same function as that illustrated in FIGS. 5 and 6 are provided with the same item numbers as those used in FIGS. 5 and 6. A birefringence concave lenses 224 of the LC transparent lens unit 320 comprises a second LC layer composed of LC molecules whose alignment is parallel to the transparent glass substrate 221b, i.e., the optical axis of the LC molecules is parallel to the polarized direction of the incident light. For the incident light, the birefringence concave lenses 224 have a second ordinary refractive index $n_{e2}$. The difference between the LC lens unit 320 in the present embodiment and the LC lens unit 220 in the second embodiment is that, the refractive index of the concave lenses 224 equals to the second extraordinary refractive index $n_{e2}$. In order to show a 3D image, not only making the first ordinary refractive index $n_{o1}$ equaling to the second extraordinary refractive index $n_{e2}$, but also adjusting the equivalent refractive index $n_{eff}$ of the LC convex lens 222 in a range between the first ordinary refractive index $n_{o1}$ and the first extraordinary refractive index $n_{e1}$ are required. That is, when the equivalent refractive index $n_{eff}$ of the LC convex lens 222 is equal to the second extraordinary refractive index $n_{e2}$ of the birefringence concave lenses 224, there is no refractive index difference between the LC convex lens 222 and the birefringence concave lenses 224. The light can progress in straight lines, which allows the viewer to see 2D images from the emitting surface 232. When the equivalent refractive index $n_{eff}$ of the LC convex lens 222 is greater than the second extraordinary refractive index $n_{e2}$ of the birefringence concave lenses 224, the incident polarized light enters an optically thinner medium from an optically denser medium. In this way, the incident polarized light refracts at the junction of the LC convex lens 222 and the birefringence concave lenses 224 and focuses on the human eye. That's why a user can see 3D images from the emitting surface 232.

Although the present invention has been explained by the embodiments shown in the drawings described above, it should be understood to the ordinary skilled person in the art that the invention is not limited to the embodiments, but rather various changes or modifications thereof are possible without departing from the spirit of the invention. Accordingly, the scope of the invention shall be determined only by the appended claims and their equivalents.

What is claimed is:

1. A 2D/3D switchable display device comprising: a backlight module for generating light, a liquid crystal display panel for showing an image based on the light from the backlight module, and a liquid crystal (LC) lens unit, the light emitting from the liquid crystal display panel being polarized light, the LC lens unit from an emitting surface to an incident surface orderly comprising:

a plurality of bar-shaped concave lens;

a plurality of bar-shaped LC convex lens, each LC convex lens corresponding to one of the bar-shaped concave lens, the plurality of LC convex lens comprising a transparent substrate, a conductive layer on the transparent substrate, and a first LC layer sandwiched between the concave lens and the transparent substrate, characterized in that:

the conductive layer comprises a plurality of control electrodes shaped as bars which extends along a direction parallel to an extending direction of the bar-shaped LC convex lens, wherein the plurality of control electrodes are applied to a driving voltage to control an alignment of LC molecules inside the LC convex lens to adjust an equivalent refractive index of the LC convex lens larger or equaling to a first refractive index of the concave lens, the concave lens is a birefringence concave lens comprising a second LC layer composed of a plurality of liquid crystal molecules of which an alignment is perpendicular to the transparent substrate.

2. The display device of claim 1 characterized in that the refractive index of the concave lens equals to an extraordinary refractive index of LC molecules of the first LC layer.

3. The display device of claim 1 characterized in that the LC lens unit cooperates with linear polarized light and the bar-shaped LC convex lens extend along a first direction and arrange in a second direction perpendicular to the first direction, the polarized direction is perpendicular to the first direction.

4. The display device of claim 3 characterized in that the LC convex lens further comprises an alignment film disposed between the first LC layer and the transparent substrate, and the alignment is used for aligning the optical axis of the liquid crystal molecules inside the first LC layer with first direction before an electric field is applied on the liquid crystal molecules inside the first LC layer.

5. The display device of claim 4 characterized in that the LC molecules inside the first LC layer are positive liquid crystal molecules whose optical axes are parallel to a direction of the electric field, and each optical axis is slanted away from the first direction by a certain angle.

6. A liquid crystal (LC) lens unit from an emitting surface to an incident surface orderly comprising:

a plurality of bar-shaped concave lens;

a plurality of bar-shaped LC convex lens, each LC convex lens corresponding to one of the bar-shaped concave lens, the plurality of LC convex lens comprising a transparent substrate, a conductive layer on the transparent substrate, and a first LC layer sandwiched between the concave lens and the transparent substrate, characterized in that:

the conductive layer comprises a plurality of control electrodes shaped as bars which extends along a direction parallel to an extending direction of the bar-shaped LC convex lens, wherein the plurality of control electrodes are applied to a driving voltage to control an alignment of LC molecules inside the LC convex lens to adjust an equivalent refractive index of the LC convex lens larger or equaling to a first refractive index of the concave lens, the concave lens is a birefringence concave lens comprising a second LC layer composed of a plurality of liquid crystal molecules of which an alignment is parallel to the transparent substrate.

7. The LC lens unit of claim 6 characterized in that the refractive index of the concave lens equals to an extraordinary refractive index of LC molecules of the first LC layer.

8. The LC lens unit of claim 6 characterized in that the LC lens unit cooperates with linear polarized light and the bar-shaped LC convex lens extend along a first direction and arrange in a second direction perpendicular to the first direction, the polarized direction is perpendicular to the first direction.

9. The LC lens unit of claim 6 characterized in that the LC convex lens further comprises an alignment film disposed between the first LC layer and the transparent substrate, and the alignment is used for aligning the optical axis of the liquid crystal molecules inside the first LC layer with first direction before an electric field is applied on the liquid crystal molecules inside the first LC layer.

10. The LC lens unit of claim 9 characterized in that the LC molecules inside the first LC layer are positive liquid crystal molecules whose optical axes are parallel to a direction of the electric field, and each optical axis is slanted away from the first direction by a certain angle.

11. The LC lens unit of claim 6 characterized in that an extraordinary refractive index of the liquid crystal molecules inside the first layer is 1.2 times larger than an ordinary refractive index of the liquid crystal molecules.

* * * * *